(12) United States Patent
Martinez Mardones

(10) Patent No.: US 8,350,395 B2
(45) Date of Patent: Jan. 8, 2013

(54) MARITIME DEVICE FOR PRODUCING ELECTRIC POWER

(76) Inventor: Jorge Alfonso Martinez Mardones, Santiago (CL)

(\*) Notice: Subject to any disclaimer, the term of this patent is extended or adjusted under 35 U.S.C. 154(b) by 311 days.

(21) Appl. No.: 12/917,739

(22) Filed: Nov. 2, 2010

(65) Prior Publication Data

US 2011/0266803 A1    Nov. 3, 2011

(30) Foreign Application Priority Data

Nov. 2, 2009  (CL) .................................. 2021-2009

(51) Int. Cl.
*F03B 13/10*  (2006.01)
(52) U.S. Cl. ........................................ 290/42; 290/53
(58) Field of Classification Search .................... 290/42, 290/53; 60/398
See application file for complete search history.

(56) References Cited

U.S. PATENT DOCUMENTS

| | | | | |
|---|---|---|---|---|
| 3,569,725 A | * | 3/1971 | Rosenberg | ........................ 290/53 |
| 4,454,429 A | * | 6/1984 | Buonome | ........................ 290/53 |
| 4,560,884 A | * | 12/1985 | Whittecar | ........................ 290/42 |
| 4,931,662 A | | 6/1990 | Burton | |
| 5,186,822 A | * | 2/1993 | Tzong et al. | ........................ 290/42 |
| 6,457,307 B1 | * | 10/2002 | Feldman et al. | ................. 60/398 |
| 7,468,563 B2 | | 12/2008 | Torch | |

FOREIGN PATENT DOCUMENTS

| | | |
|---|---|---|
| CL | 37585 | 4/1991 |
| GR | 1003263 B1 | 11/1999 |
| WO | WO 2008/103344 A2 | 8/2008 |

\* cited by examiner

*Primary Examiner* — Tho D Ta
(74) *Attorney, Agent, or Firm* — Hasse & Nesbitt LLC; Daniel F. Nesbitt

(57) ABSTRACT

An energy accumulator and rectifier equipment for converting and generating renewable energy from ocean waves and winds, which includes a storage tank or compressed air accumulator, a series of vertical tubes filled with non-compressible fluid so that it can displace movable elements, forming a group, wherein each group is in connection with another similar group at both the upper level and the lower level by means of a fluid circulation pipes and by means of a pipe of smaller diameter, at the upper and lower portion, for air circulation, and wherein the fluid circulation pipes of every group are attached to a common pipe at the upper level which conveys the fluid toward a turbine-generator to produce electricity and a common pipe at the lower level to recirculate fluid toward the cylinders.

7 Claims, 11 Drawing Sheets

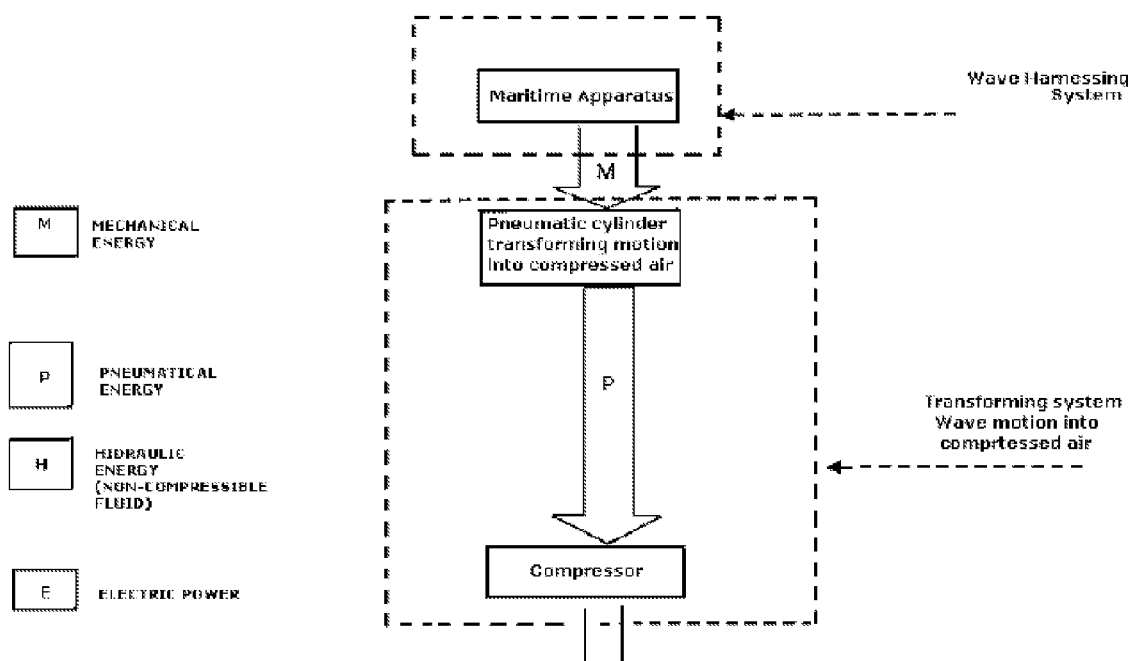

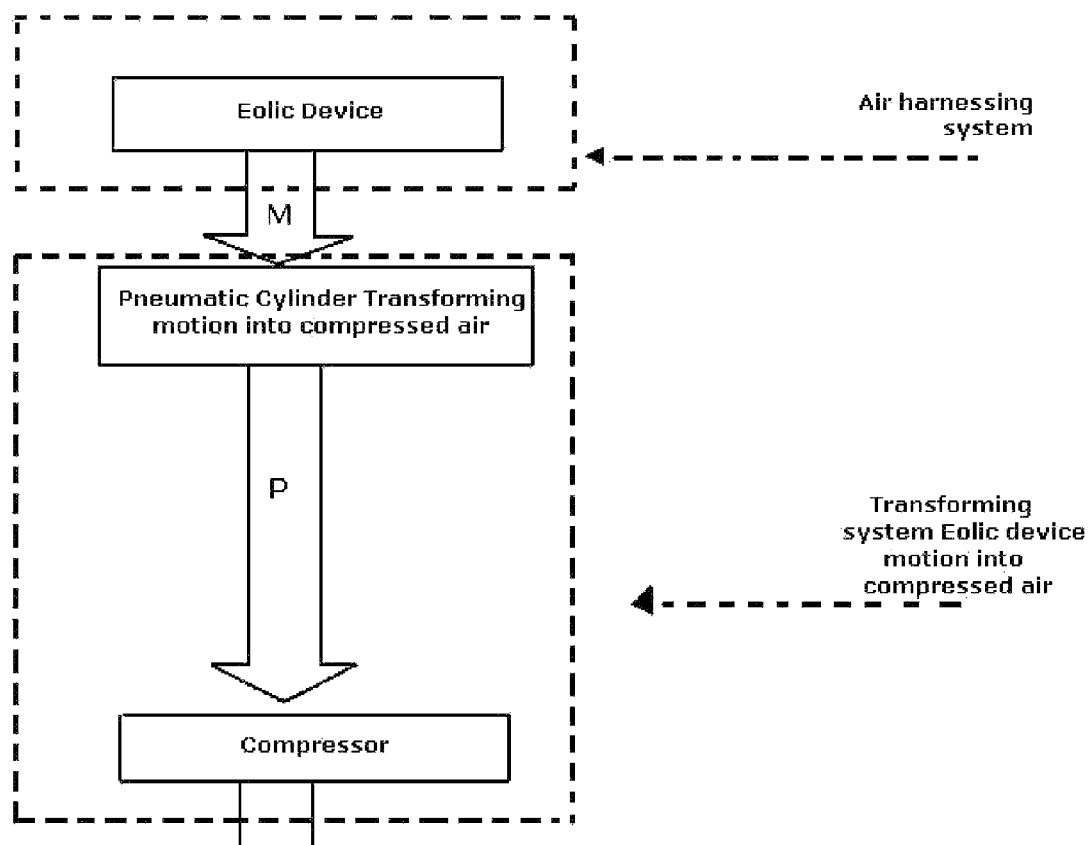

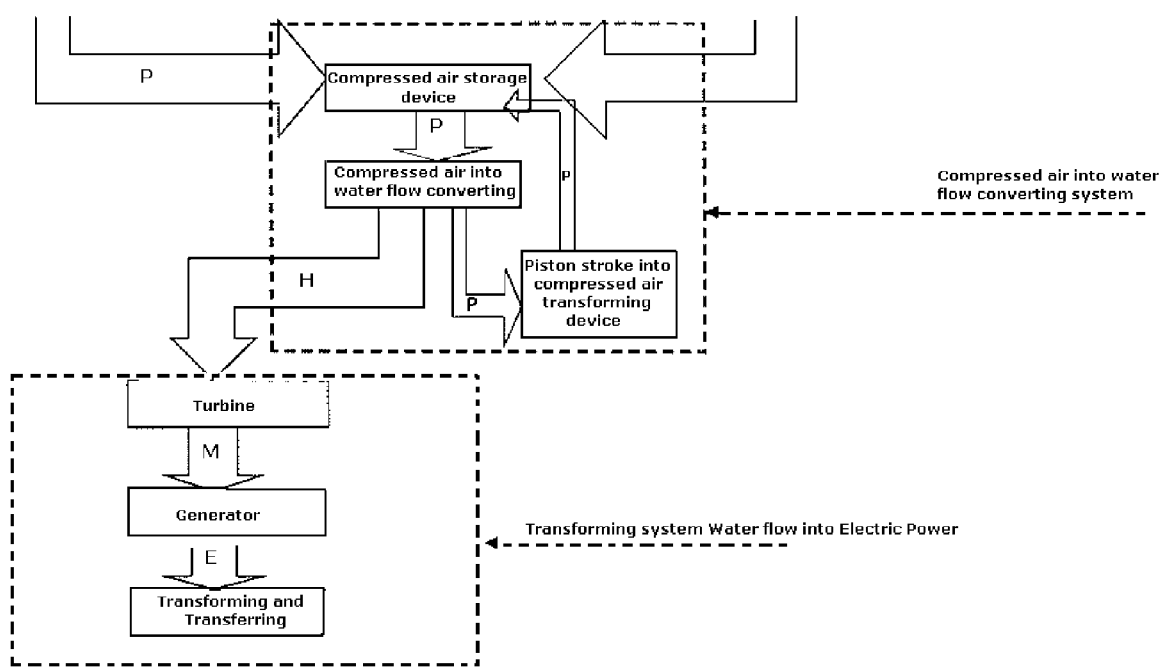

MARITIME DEVICE FOR PRODUCING ELECTRIC POWER

Figure 1:
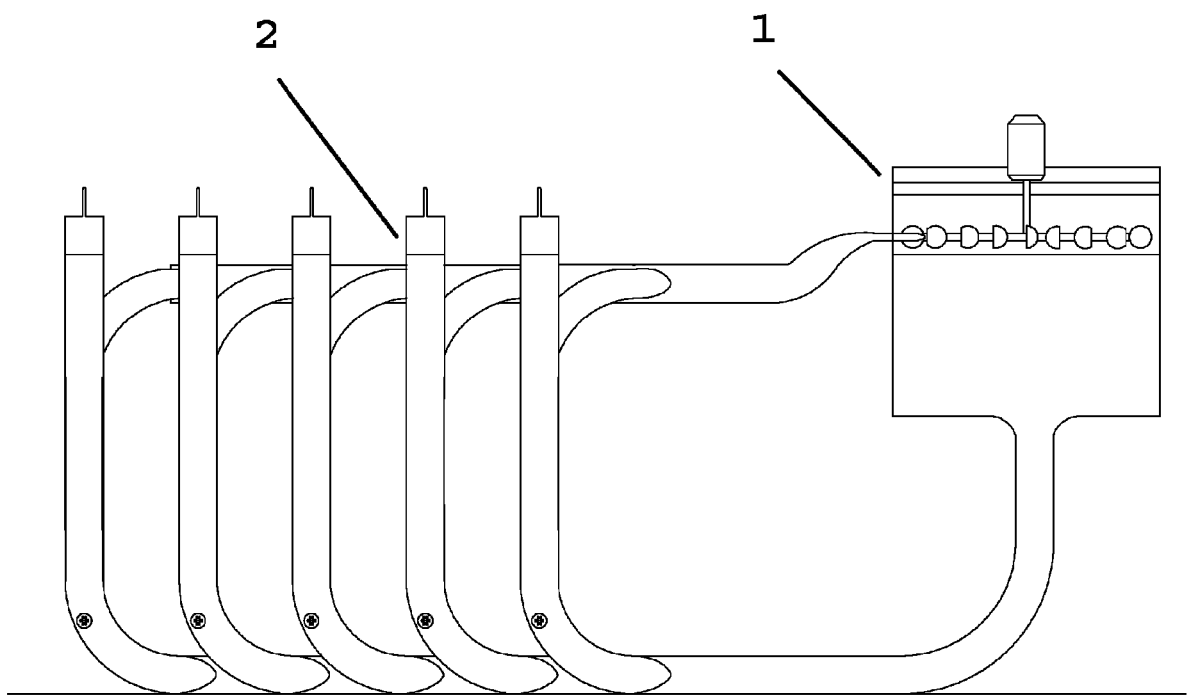

The present invention relates to energy generation from the conversion of the energy available in natural resources as ocean waves or wind. Specifically, it aims at optimizing plant factors associated with renewable energy generation, which are affected by the irregularities of natural resource energy availability, varying over periods of time and magnitudes of energy which are discontinuous and difficult to predict. Such optimization is possible due to the disposal of equipment capable of rectifying the irregularities of energy harness to deliver such energy by means of steady fluid flows, and harness energy as compressed air in order to regulate it, thus increasing supply guarantee.

The energy harnessing and rectifying equipment of the present invention is used in two alternative embodiments. The first embodiment consists of maritime device to harness power from waves and transfer it to the hydraulic device to generate electric power. And the second similar to the first one, with regard an eolic device to generate power from wind.

BACKGROUND OF THE INVENTION

Nowadays, the search for renewable energies sources and the optimization of the conversion of the energy harnessed from such sources into forms which can be exploited for domestic and industrial activities of the human being is a key target for the development of new technologies.

Specifically, with regard to the equipment aimed at generating electric power from ocean waves, there is extensive patent and non-patent literature; the present systems being categorized according to the principle of harnessing energy from waves, the location of such equipment, and the size and orientation.

Accordingly, the international publication WO 2008/103344 (equivalent to U.S. Pat. No. 7,468,563), describes a device to generate power from ocean waves, which uses such motion to raise and lower one end of a stationary arm, which has a pivot point. The other end of such arm which is opposed to such pivot enables a piston to go up and down within a cylinder so that large amounts of air are moved. Such air is conveyed through turbines to generate electrical power.

A similar solution is observed in Chilean patent CL 37585, which describes a device to convert energy from ocean waves into electrical power comprising a long a rigid beam supported between ends by a pivot supported by a platform attached to the sea bed, one end of beam extends towards the ocean, a circular float is supported from that outer end of the beam by a universal joint. The inner end of the beam at the end opposite the float is in connection with the hydraulic or fluid pumps to produce hydraulic fluid or fluids under pressure in response to the wave motion on the float, this hydraulic fluid or fluids under pressure drive the power generator. It also operates through an arm connected to a float, and on the other end, including means to cause displacement of the hydraulic fluid.

On the other hand, document GR1003263 discloses an energy generating coastal plant, which consists of a long and narrow platform or floating pontoon which, by being attached to the coast, is able to resist ocean or lake waves, absorbing their kinetic energy, and it is able to convert this energy into electricity; for this purposes, two elements are provided and confined in reservoirs under the platform: water and air used for transferring wave kinetic energy to electric power generating plant. More precisely, water is confined in reservoirs, and propelled by ocean waves thus alternatively moving a piston which transfers kinetic energy to the confined air. Then, the confined air transfers kinetic energy through air pipes to the air turbine of the electric power generating plant thus converting it into electricity.

None of the documents of the previous art describes an associated system for accumulating and rectifying energy which allows a stable and permanent delivery of energy regardless of the irregularities of the original source; either ocean waves or wind. No solution equivalent to that of the present application has been found in the previous art. In fact, even though there is some literature in the previous art which discloses the use of ocean waves to move pneumatic and hydraulic cylinders, and thereby generate compressed air for generating electric power, none of such documents discloses the system for converting the kinetic energy from the ocean motion into electric power as it is disclosed in the present invention.

This is, none of the previous systems comprises the four main elements of this marine device for generating compressed air which, once accumulated, it is transferred into a hydraulic system which, by means of a specific alternate motion, generates electric power. Accordingly, the system of the invention and its associated method are novel with regard to the prior art.

Like ocean swell, wind is a random resource in nature and thus, the accurate assessment of the eolic resource is a difficult and uncertain task. The reasons for the above are as follows:

A high variability of wind speed found in different regions of a country from an annual average wind speed of 2 m/s to 4 to 7 m/s in windy places. This wind variation implies a higher variability of the power available, from 40 to 200 W/m2.

Huge differences in wind speed (and therefore its power) are observed over short distances due to the changing land topography and its roughness. Over short distances the colic power may vary by one order of magnitude.

It is difficult to measure accurately the eolic potential. Wind is generally measured considering its speed and direction. The colic power is proportional to the cube of wind speed which means that a small error in its measurement leads to bigger error in the calculated power. For example, the eolic power of wind at 5 m/s is twice wind at 4 m/s ($5^3/4^3=125/64\sim2$). An error of 10% in wind speed measure implies a 33% error in the calculated eolic power.

This means that the security of the eolic resource is low, and thereby the plant factor associated with eolic-type generating stations as well as those using ocean waves, is around 30% at the most.

Nowadays, the most common system for obtaining colic energy is through aerogenerators which comprise blades that by crossing wind or through these make it turn and such turn is used by the generator which is directly coupled to the blade system. This system comprises four major limitations with regard to the exploitation of the resource:

1. According to Betz's law, the energy efficiency can be up to 60% at the most, since to make blades turn there must be a certain outgoing wind speed behind the blades, which is lower than the incoming wind speed that blades encounter. Therefore, the energy used is only the energy from the difference between the incoming wind speed and the outgoing wind speed from the blades.

2. The system operates until a certain range of maximum wind speed since beyond this limit generator hub and blades would be damaged.

3. Energy generation is produced only if there is wind available.

4. The generation system is dimensioned for a generation capacity or rated power close to the maximum possible wind speed within a range set in 2 to avoid wasting periods of high speed. Therefore, there is an increase in the cost with regard to the final use of the resource.

The present invention which is described together with an eolic device does not have any of the aforementioned disadvantages since it reduces to zero the outgoing wind speed and thus the resource is utilized in its entirely; it can be used in very high wind speed ranges, limited only by hurricane-force winds or similar phenomena; the energy generation may be carried out when it is necessary since this system will use the energy accumulator and rectifier system of the invention to store, regulate and have the energy at its disposal, with a high degree of wind energy independence.

The main problem this invention solves is the generation of stable and sustained energy using renewable, clean, easy to access and high-potential energy.

Secondly, it solves the cost issues associated with harnessing renewable energies, since nowadays these costs can not compete on equal terms with conventional energy generating stations. Preliminary estimates indicate that this invention reduces costs for harnessing energy resulting in values slightly higher than conventional energies.

Additionally, it solves the issue of plant factors associated with renewable energy generating facilities since it is capable of harnessing energy as compressed air in order to regulate it, regardless of the variability of source of origin. Thus increasing supply security as well as increasing the potential plant factor.

DESCRIPTIONS OF THE DRAWINGS

FIG. 1. Elevation view of the power rectifier and generator equipment of the present invention comprising the turbine generator group (1) and cylinders (2).

Figure 2:
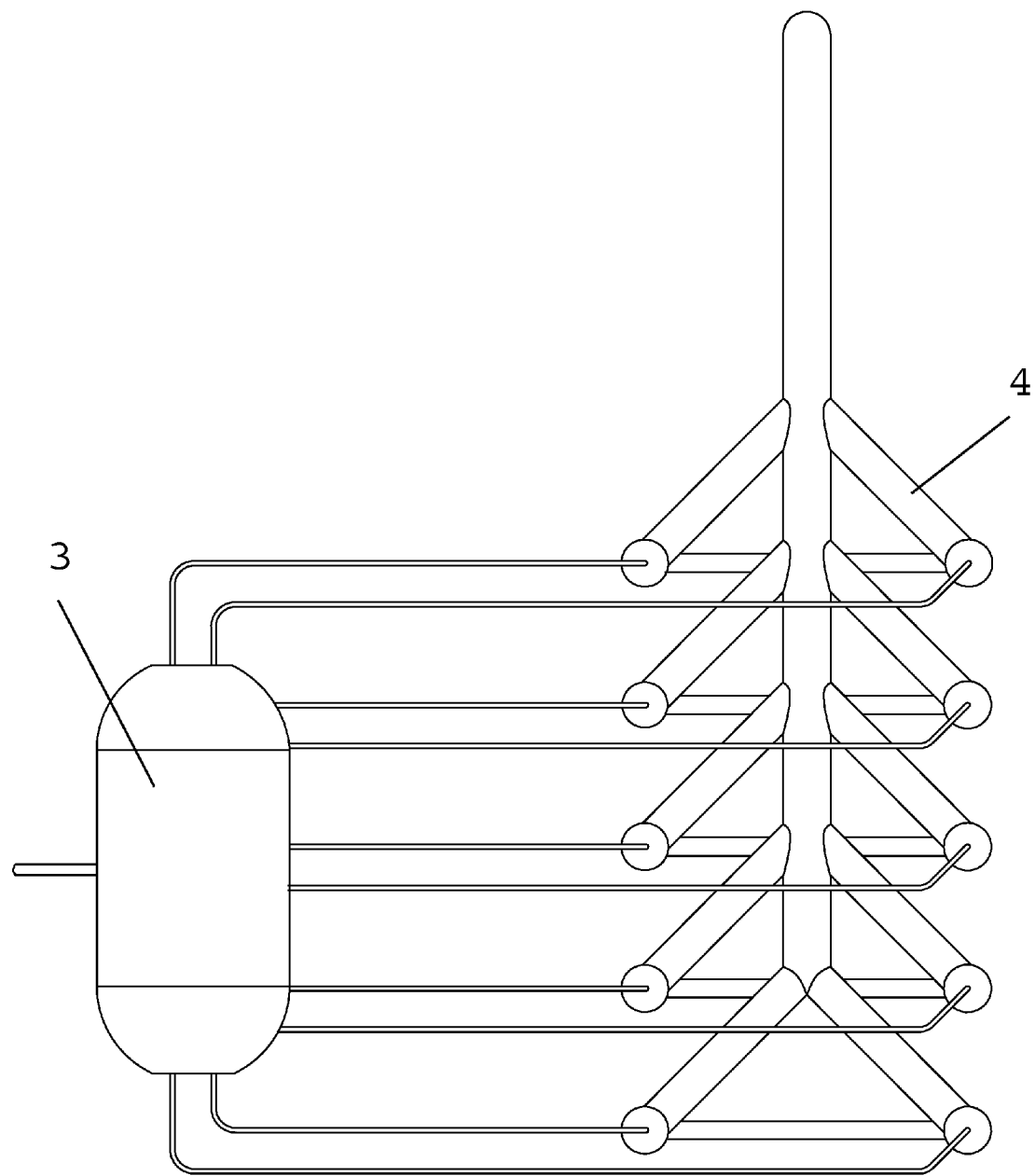

FIG. 2. Top view of the power rectifier and accumulator equipment of the present invention comprising: the accumulator (3), and pipe lines for conveying fluid toward the turbine generator group (4).

Figure 3:
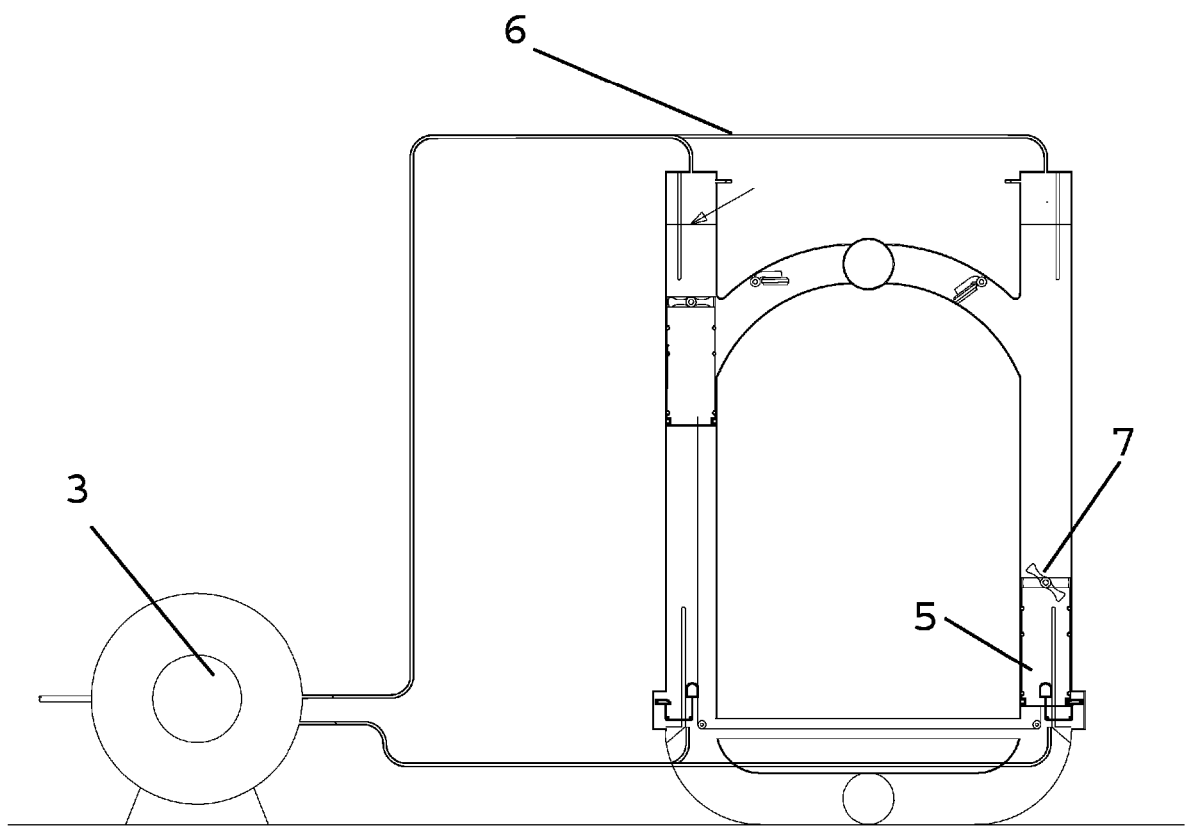

FIG. 3. Sectional view of the power rectifier and accumulator equipment of the present invention comprising the accumulator (3), the movable pistons (5), air pipelines (6) and a movable piston open-close valve (7).

Figure 4:
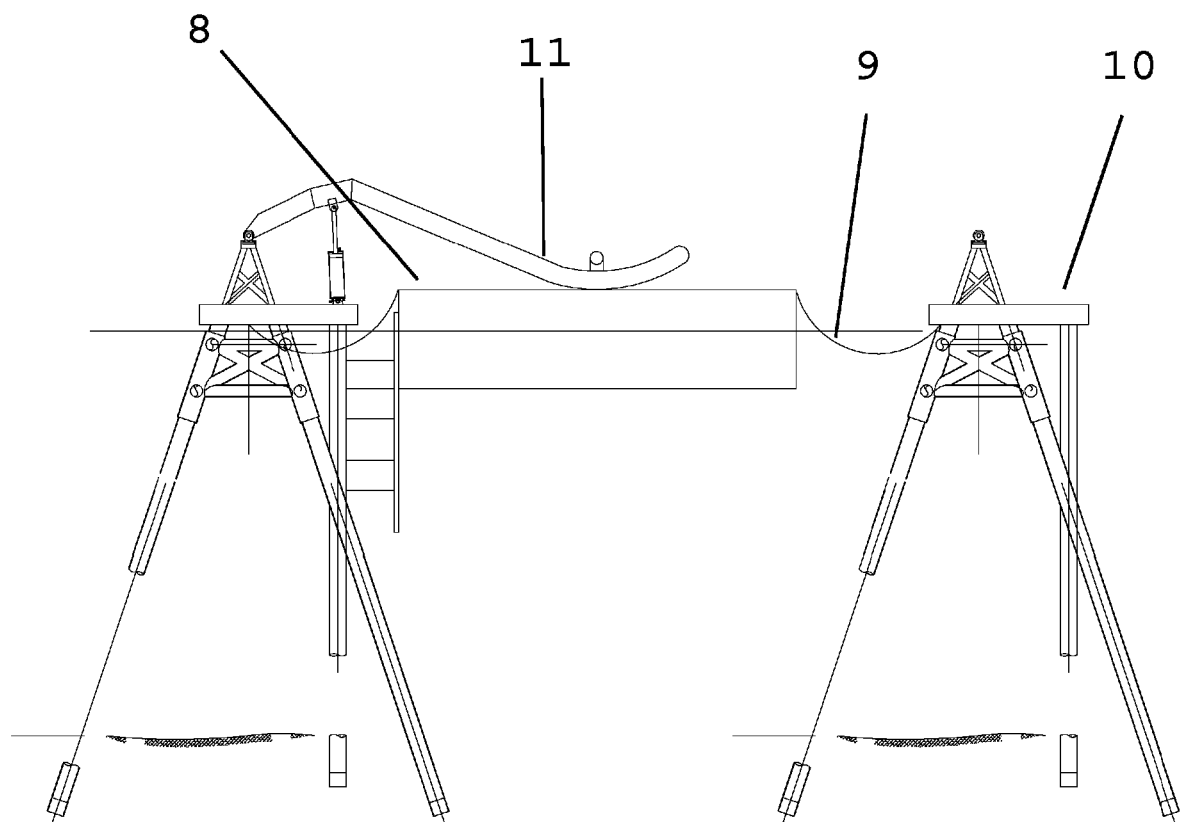

FIG. 4. Elevation view of an ocean wave energy generating device, which comprises an air cylinder (8), a floating pontoon (9), a breasting dolphin (10) and an articulated arm (11).

Figure 5:
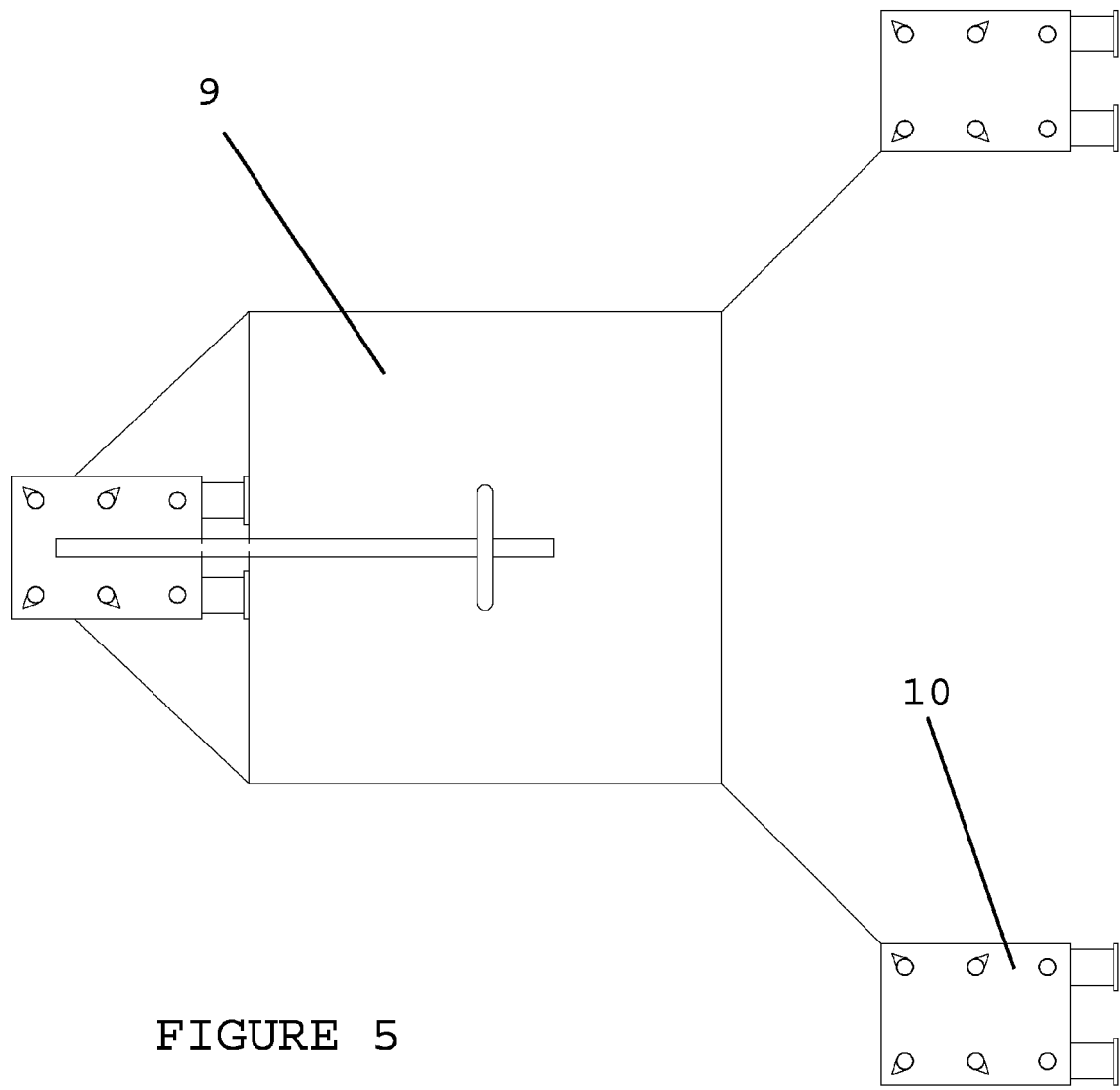

FIG. 5. Top view of the ocean wave energy generating device with the floating pontoon (9) and the breasting dolphins (10).

Figure 6:
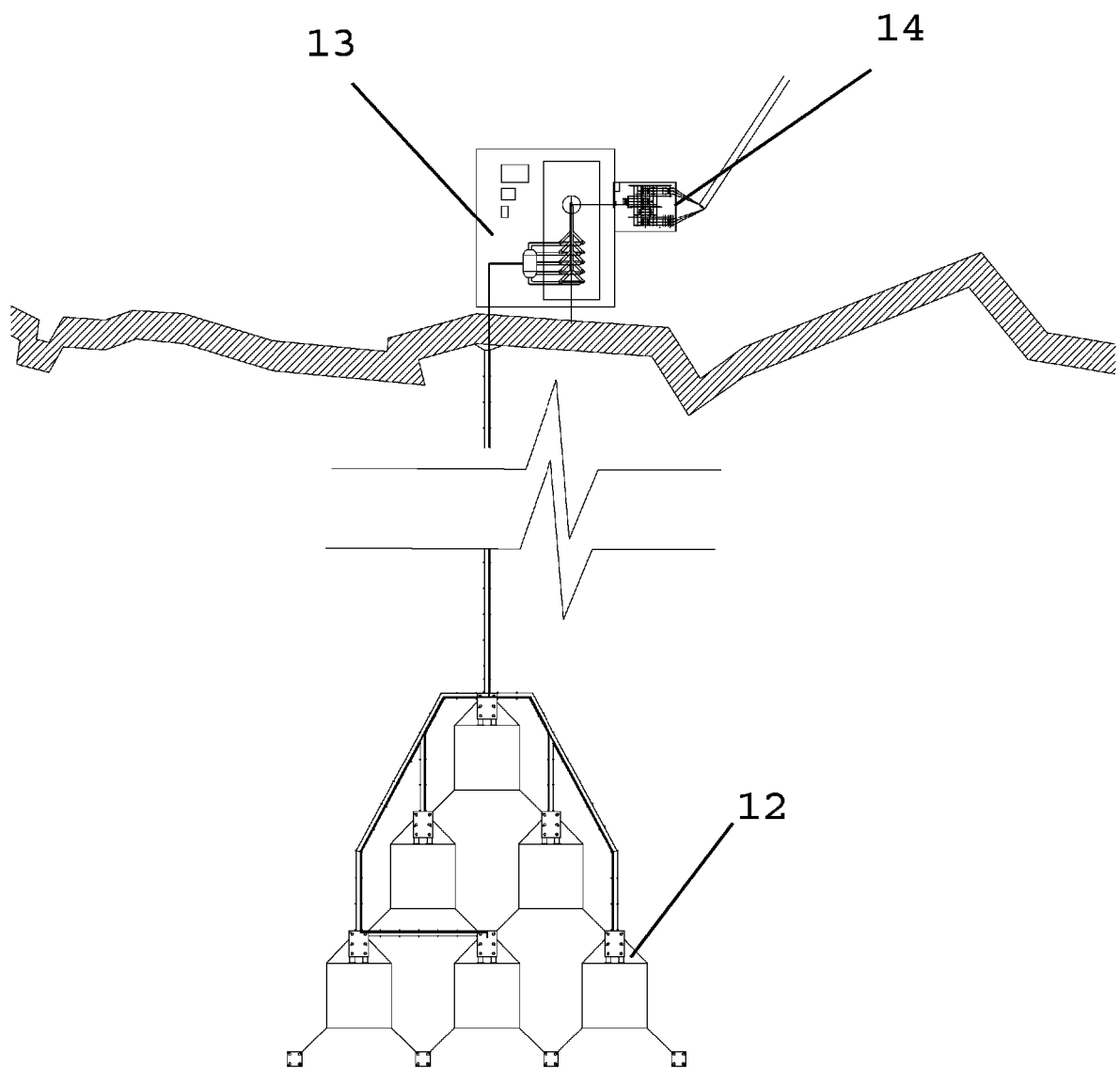

FIG. 6. Possible arrangement of the ocean wave energy generating marine device (12) together with the energy accumulator and rectifier equipment (13) and the electric power output substation (14).

Figure 7:
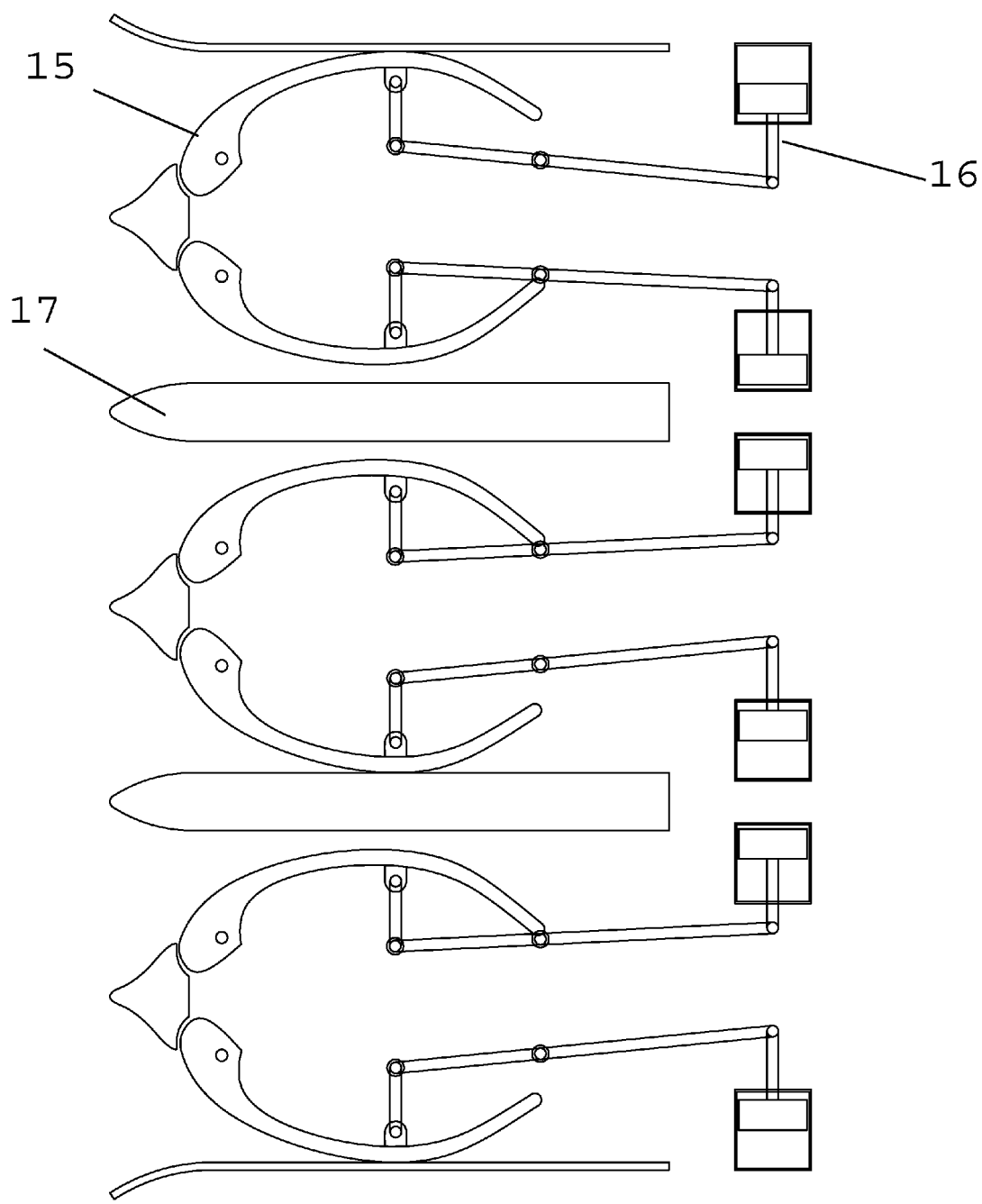

FIG. 7. Top view of the ocean wave energy generating device with the sail or flag (15), the air piston (16) and vertical screen (17).

Figure 8:
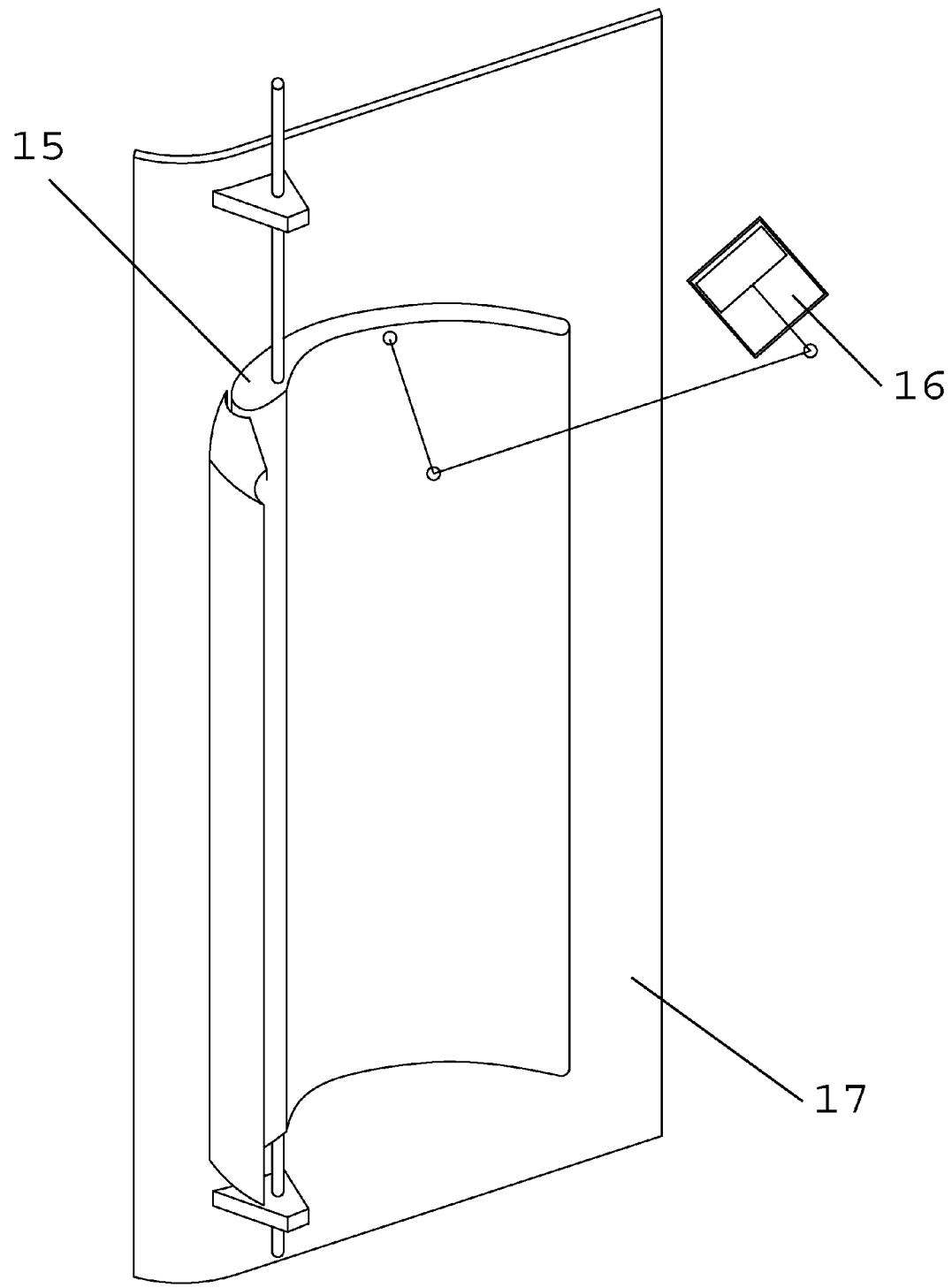

FIG. 8. Perspective view of the energy generating device from wind sail or flag energy generating device (15), the air piston (16) and the vertical screen (17).

FIG. 9. Process for harnessing ocean and eolic energy and their transferring to the hydraulic device to obtain electric energy.

DETAILED DESCRIPTION OF THE INVENTION

The present invention consists of an ocean wave or wind energy accumulator device for further converting it into mechanical energy and later, into electric power, and the use thereof in the corresponding devices for harnessing energy from ocean waves and from eolic energy. Likewise, the invention relates to a method for harnessing energy from renewable sources of energy and their further conversion into electric power.

The energy accumulator and regulator device uses compressed air as energy storage, together with a non compressible fluid for using the stored energy.

As shown in FIGS. 1, 2 and 3, this device comprises a storage tank or accumulator of compress air (3) which is fed from flows coming either from the ocean wave energy generating device or from wind energy generating device, which convert the renewable energy into compressed air and transfer such energy to this accumulator.

Attached to said accumulator, there is provided a series of vertical tubes (cylinders) (2) full of non-compressible fluid wherein movable elements (5) can move, said movable elements (5) comprises another tube with a smaller diameter and length, and the upper portion thereof being covered by a valve (7) which is included and housed inside the vertical tube, both together form an impermeable seal by means of perimetral rings specially designed for this purpose. Every group comprises two cylinders and two movable elements which are attached to other similar groups as needed. Each group is attached to another similar group both at the upper level and at the lower level by means of pipes for fluid flow (4), and by means of pipes of smaller diameter at the upper and bottom portions, for air circulation (6).

The pipes of each group are attached to a common pipe at the upper level which conveys fluid towards the turbine-generator to produce electricity and return it towards the cylinders through pipes at the lower level.

It also comprises retention valves at the upper portion to control fluid flows in both directions of the cylinder-movable element, and other diverse valves.

This device mainly uses the hydraulic energy from the generated flow as well as from the kinetic energy through the strength of the stroke of the movable element at the end of its trajectory. For this purpose, the maritime or eolic device produces compressed air, as stated before, which is stored in an accumulator which is common for the entire device. This accumulator stores and regulates the air that goes into each one of the movable elements, by means of air pipes and valves arranged at the lower level of every cylinder; such valves are opened when the movable element is in the lowest level of its trajectory so that the required air is injected to fill all the space available. When the movable element if full of air, a safety device is open to allows the movable element goes up thus displacing fluid which covers it thereby generating the flow that might be used in a Pelton turbine or the like. Since there is a plurality of cylinders which will be used in the device, there will be a system which will program air injection and safety devices by means of electro-actuated valves or the like.

When the movable element goes up to the cylinder until the upper end, it will not be able to propel the flow toward the turbine due the device arrangement. At said moment, it will strike an air chamber that will cause the kinetic energy of the movable element transforms into compressed air that will be conveyed to the accumulator by means of pipes, and will be controlled by retentions valves arranged at the accumulator inlet. This will also be used as a movable element travel brake.

Compressed air is conveyed through pipes to each movable element, which being submerged at the cylinder lower end, goes up inside the cylinder due to its push, thus generating an hydraulic flow that is used by a turbine attached to each cylinder through pipes. This cycle is repeated for each movable element, generating a turbine steady flow, since the incoming air to movable element is sustained. The movable element which has gone up to the cylinder upper limit, gets rid of the air stored inside by means of a valve housed in the upper cover which is open in that moment to later be displaced to the cylinder lower end which is dragged by the movable element which is traveling up, since they are secured by a means such a cable, to be filled with compressed air again.

In this way, this device can store energy and control its use, regulating air flows to movables elements, and thus, regulating turbine usable flows.

As stated before, the energy accumulator and rectifier equipment is fed by compressed air, in a first embodiment, from a maritime device by means of a motion produced by waves.

With reference to FIGS. 4 and 5, the marine device is defined by a floating pontoon (9) with articulated arm (11), an air cylinder (or piston), and a breasting system which consists of (10) mooring dolphins and breasting dolphins.

Its operation consists of a floating pontoon (9) which by following wave motion generates an ascending and descending vertical displacement of an articulated arm (11) attached to this pontoon. This arm comprises a ball socket end secured to a pile structure (mooring dolphins) and the other end is mounted on a floating pontoon (9) with its end trapped in a ring attached to the pontoon, which enables free movements thereon, with the exception of the ascending and descending motion.

This motion is used for the ball socket arm to activate a piston inside the cylinder, also located on the pile structure, which generates compressed air that flows to the hydraulic device accumulator based on land by means of pipes mounted over a walkway founded on piles.

The complete device-apparatus assembly will be located on coastal areas, so that the pontoon can move through wave motion and the hydraulic device can be based on land in order to reduce the compressed air pipe length from the marine device to land.

According to a second embodiment of the invention, the energy accumulating equipment can operate in conjunction with an eolic energy harnessing apparatus. With reference to FIGS. 7 y 8, such apparatus consists of three main elements. A sail or flag (15), vertically arranged and facing wind with vertical axis which crosses the sail and make it pivot thereon, a vertical screen (17), parallel to the sail and secured by its support and an air piston (16) which generates compressed air by sail or flag motion.

The sail and the axis (15) are arranged close to the vertical screen (17), so that when wind strikes both structures it brings the sail close to the screen until closing wind passing and then move the sail away an thereby, the sail is made to flap as a flag does with the wind.

The sail is secured to a ball socket arm of an air piston which through continuous sail motion generates compressed air which is transferred to the aforementioned hydraulic device accumulator. In order to follow the direction of the wind, the system will pivot on a common axis.

Since this renewable resource for harnessing energy is irregular in nature, as stated before, the invention standardizes the production of usable energy.

The energy production efficiency improvement will be exemplified with reference to the first embodiment of the invention based on the ocean wave energy generation.

Nowadays, the scarce literature on inventions that harness waves as energy source indicate that the plant factor values (corresponding to the actual power produced over a given period divided by the rated power over the same period) for some of these are as follows.

Pelamis technology (developed by Pelamis Wave Power, PWP) is the only technology which has been commercialized until now, consists of a great length floating cylinder which is articulated in the middle, when such cylinder is being exposed to waves, it pivot on it articulation thus generating an oil flows which is transformed into energy inside such cylinder. It is used offshore. Its plant factor ranges between 13% and 15%, being able to reach 30% in areas exposed to large waves.

Seawave Slot-Cone Generator (SSG) is an experimental technology which consists of big concrete box-structure founded on the coast with a diagonal wall exposed to waves comprising different openings at different heights, which by being stricken by waves, water goes up through these openings thus generating a level difference between ocean water and inner water, which is made to pass through turbines to recover this energy. The plant factor thereof is calculated around 25%.

Generally, for other types of technologies related to wave resource, the maximum acceptable plant factor is considered to be 30%.

The low plant factor value of these Technologies is mainly due to the energy resource supply irregularities and not due to lack of supply itself, this is, since there is a possibility to produce the maximum possible energy over a given period, the equipment is dimensioned to have a generating capacity or rated power close to that maximum, so that these high periods are not wasted. Therefore, as stated above this high generation is captured, but for the rest, it is generated at a power level which is lower than the rated value, thereby reducing plant factor.

With regard to the above, an example is provided in which the plant factor is calculated for one-day generation using Palamis technology and considering a rated generation of 750 kW. This means that this is a hypothetical situation since values over one-day period are more favorable than over longer periods.

| | Waves | | |
| --- | --- | --- | --- |
| Time | Amplitude (m) | Period (s) | Power (kW) |
| 0:00:00 | 0.5 | 7 | 0.0 |
| 1:00:00 | 0.5 | 8 | 0.0 |
| 2:00:00 | 1.5 | 9 | 78.0 |
| 3:00:00 | 1.5 | 6 | 65.0 |
| 4:00:00 | 1.5 | 5 | 32.0 |
| 5:00:00 | 3 | 8 | 332.0 |
| 6:00:00 | 4 | 9 | 475.0 |
| 7:00:00 | 5 | 9 | 670.0 |
| 8:00:00 | 6 | 9 | 750.0 |
| 9:00:00 | 6 | 11 | 619.0 |
| 10:00:00 | 6 | 11.5 | 558.0 |
| 11:00:00 | 4 | 9 | 475.0 |
| 12:00:00 | 3 | 9 | 292.0 |
| 13:00:00 | 3 | 9 | 292.0 |
| 14:00:00 | 2.5 | 8 | 230.0 |
| 15:00:00 | 2 | 7 | 148.0 |
| 16:00:00 | 2 | 9 | 138.0 |
| 17:00:00 | 2.5 | 10 | 181.0 |
| 18:00:00 | 5 | 11 | 472.0 |
| 19:00:00 | 5 | 12 | 369.0 |
| 20:00:00 | 2 | 11 | 93.0 |
| 21:00:00 | 0.5 | 11 | 0.0 |
| 22:00:00 | 0.5 | 12.5 | 0.0 |
| 23:00:00 | 1 | 9 | 35.0 |

-continued

| | Waves | | |
|---|---|---|---|
| Time | Amplitude (m) | Period (s) | Power (kW) |
| Rated power (kW) | | | 750.0 |
| Produced power kWh | | | 6,304.0 |
| Total rated power kWh | | | 18,000.0 |
| Plant factor | | | 35.0% |

In case the proposed invention is used, a lower power should be selected for the turbine and the hydraulic device generating equipment. Air flow should be also regulates for this capacity, thus becoming able to regulate the production of energy at an even power, increasing the plant factor and thereby reducing equipment costs.

In the above example, this calculation is carried out considering a rated power of 280 kW, whose results are as follows:

| Rated power (kW) | 280.0 |
|---|---|
| kWh | 6,304.0 |
| Total rated power kWh | 6,720.0 |
| Plant factor | 93.8% |

As it can be observed, the plant factor is greater. Additionally, a high power factor due the supply security can be considered.

These examples are affected in real situations due to longer periods that have to be considered.

It may be considered that the plant factor increases when accurate data on waves of the area where the station is to be located is available, since the rated power thereof may be chosen taking into consideration the generation potential average lifespan. However, since the above is always predictive data based on statistical information available, the rated power to be chosen will be what is calculated from these models.

Accordingly, a good plant factor approximation value taking into consideration a generating station comprising the hydraulic device and the marine apparatus is around 80%.

The invention claimed is:

1. An energy accumulator and rectifier equipment which enables the optimization of plant factors associated with renewable energy generating facilities, which are affected due to irregularities in the energy availability form natural resources, wherein such equipment comprises a storage tank or compressed air accumulator which is fed from air flows from apparatuses which transform renewable energy into compressed air and convey it to such accumulator to deliver it on a continuous basis;
a series of vertical tubes (cylinders) filled with non compressible fluid so that it can displace movable elements, forming a group; each group is in connection with another similar group at both the upper level and the lower level by means of a fluid circulation pipes and by means of a pipe of smaller diameter, at the upper and lower portion, for air circulation; the fluid circulation pipes of every group are attached to a common pipe at the upper level which conveys the fluid toward a turbine-generator to produce electricity and a common pipe at the lower level to recirculate fluid toward the cylinders.

2. An energy accumulator and rectifier equipment according to claim 1, wherein said movable elements are tubes of smaller diameter and length than tubes filled with fluid and which form a seal therewith, since they include perimetral rings specially designed for this purpose; each movable element includes in the upper cover thereof an air releasing valve.

3. An energy accumulator and rectifier equipment according to claim 1, wherein each group comprises two cylinders and two movable elements as well as retention valves on the upper portion to control fluid flows in both directions of the cylinder-movable element group.

4. An energy accumulator and rectifier equipment according to claim 1, wherein said equipment comprises a system for programming air injection into the movable elements by means of electro-actuated valves and security devices which control their ascending movement.

5. A marine apparatus for electric power generation from ocean waves which comprises improved plant factors, wherein it comprises:
energy accumulator and rectifier equipment which enables the optimization of plant factors associated with renewable energy generating facilities, which are affected due to the irregularities of the natural resource energy availability, wherein such equipment comprises
a storage tank or compressed air accumulator which is fed from air flows from apparatuses that transform renewable energy into compressed air and convey it toward such accumulator;
a series of vertical tubes (cylinders) filled with non compressible fluid so that it can displace movable elements, forming a group; each group is in connection with another similar group at both the upper level and the lower level by means of a fluid circulation pipes and by means of a pipe of smaller diameter, at the upper and lower portion, for air circulation; the fluid circulation pipes of every group are attached to a common pipe at the upper level which conveys the fluid toward a turbine-generator to produce electricity and a common pipe at the lower level to recirculate fluid toward the cylinders;
a floating pontoon with an articulated arm,
a cylinder with pneumatic or hydraulic piston associated with pneumatic equipment to generate compressed air, a mooring system comprising mooring dolphins and breasting dolphins.

6. An apparatus for harnessing eolic energy to generate electric power from wind, comprising improved plant factors, wherein:
an energy accumulator and rectifying equipment which enables the optimization of plant factors associated with renewable energy generating facilities, which are affected by the irregularities of energy availability from natural resources, wherein such accumulator equipment comprises
a storage tank or compressed air accumulator which is fed from air flows from apparatuses that transform renewable energy into compressed air and convey it toward such accumulator;
a series of vertical tubes (cylinders) filled with non compressible fluid so that it can displace movable elements, forming a group; each group is in connection with another similar group both at the upper level and the lower level by means of a fluid circulation pipes and by means of a pipe of smaller diameter, at the upper and lower portion, for air circulation; the fluid circulation pipes of every group are attached to a common pipe at the upper level which conveys the fluid toward a turbine-generator to produce electricity and a common pipe at the lower level to recirculate fluid toward the cylinders;
a sail or flag vertically arranged which faces wind, a vertical screen located parallel to the sail and secured by a support, a vertical axis which crosses the sail and makes it pivot, and a system of arms and pneumatic or hydraulic cylinder associated with pneumatic equipment to produce compressed air generated by this motion.

7. Method for generating electric power from renewable sources which uses an energy accumulator and rectifier equipment according to claim 1, which enables the optimization of plant factors which are affected by the irregularities of energy availability from natural resources, wherein such method is characterized in that this accumulating equipment regulates the energy from apparatuses which transform renewable energy into compressed air and convey it toward said accumulator, wherein such air will go into every movable element of a group, by means of air pipes and valves, which are arranged at the lower level of each cylinder and which are open when the movable element is located at the lowest level of its trajectory so that the necessary air is injected to fill the available space; once the movable element is filled with air, the security device is open to allow such element to go up displacing the covering fluid thanks to its push, thus generating the flow which can be used in a Pelton turbine or the like which is attached by pipes to each cylinder; when the movable element goes up to the cylinder upper level, it will not be able to propel fluid flow toward the turbine due to the design of the device; in this moment, it will strike an air chamber that will cause the movable element kinetic energy to be transformed into compressed air which will be conveyed toward the accumulator by means of pipes and will be controlled by retention valves arranged at the accumulator inlet; this will be also used as the brake for the displacement of the movable element; this cycle is repeated for each movable element, thus generating a turbine steady flow, since the incoming air to movable element is sustained;

the movable element which has gone up to the cylinder upper limit, gets rid of the air stored inside by means of a valve housed in the upper cover which is open in that moment to later be displaced to the cylinder lower end which is dragged by the movable element which is traveling up, since they are secured by a means such a cable, to be filled with compressed air again allowing the cycle to continue.

* * * * *